Patented Apr. 25, 1950

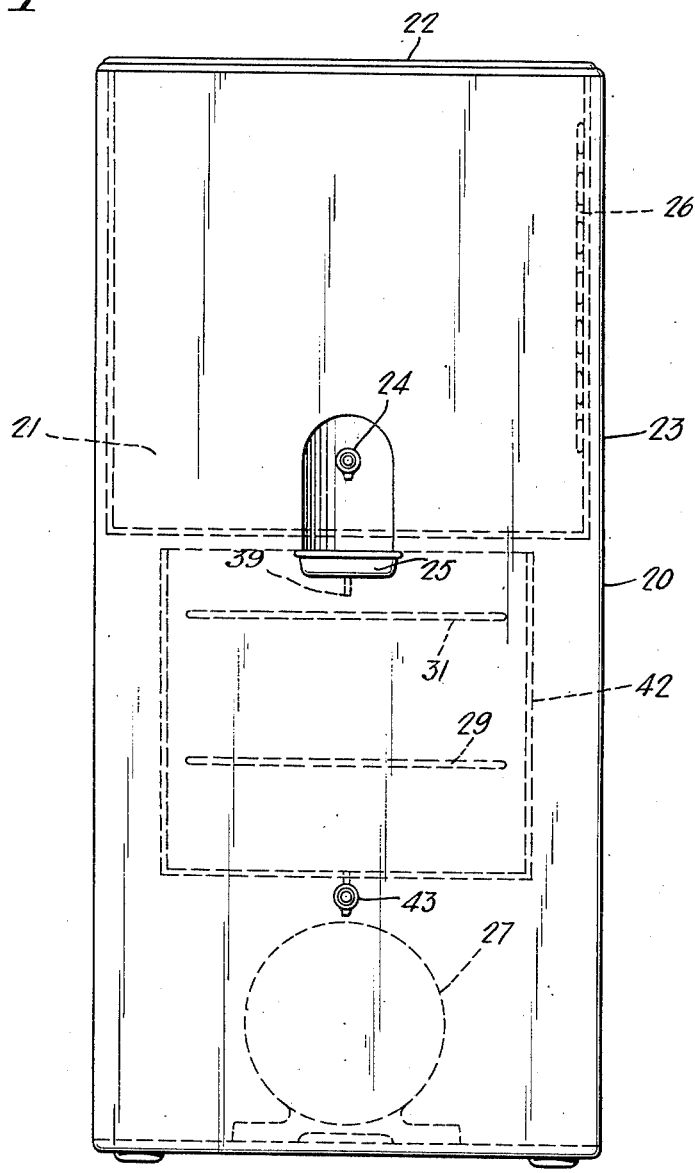

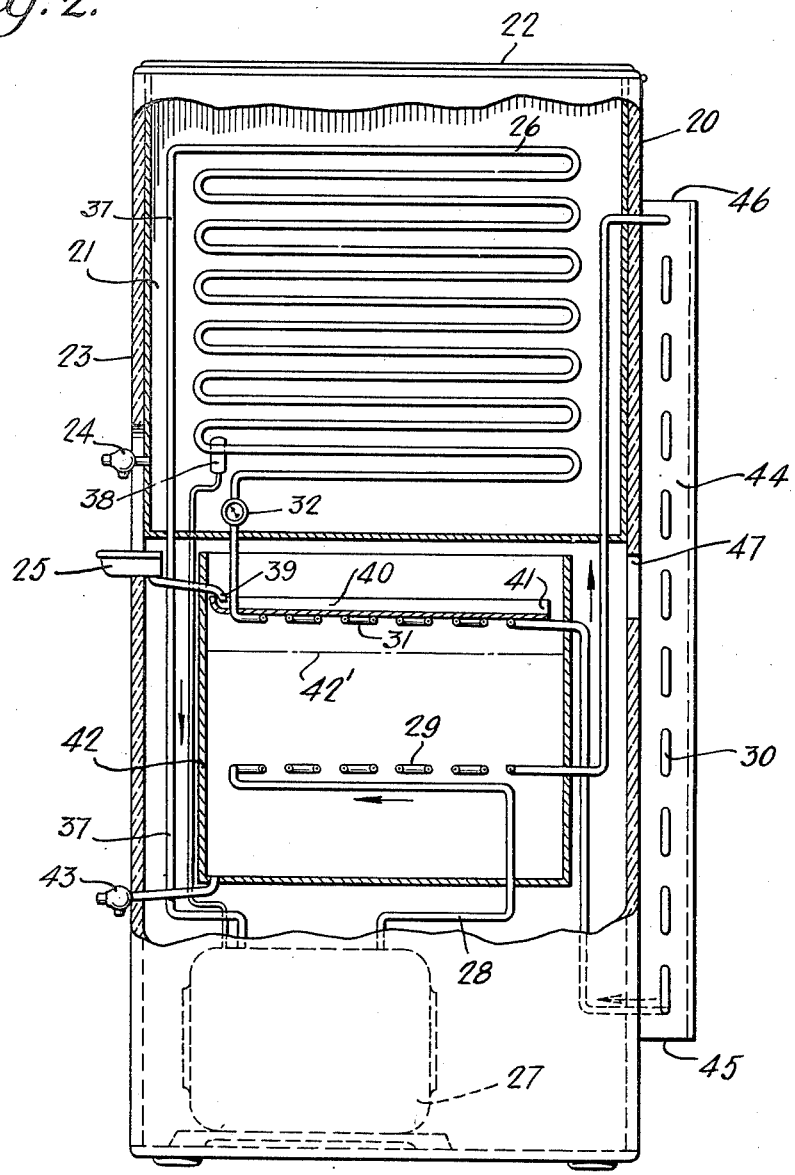

2,505,632

UNITED STATES PATENT OFFICE 2,505,632

WATER COOLER HAVING WATER AND AIR COOLED CONDENSERS

John G. Wehrwein, Havertown, Pa., assignor to Sunroc Refrigeration Company, Dover, Del., a corporation of Delaware Application November 25, 1947, Serial No. 787,915

2 Claims. (Cl. 62—141)

My invention relates to water coolers and drinking fountains.

A purpose of my invention is to utilize the vaporizing of waste water from a waste water storage compartment to cool the condenser or a condenser of a water cooler.

A further purpose is to provide cooling by a waste water channel in heat transfer relation with one condenser and a waste water storage compartment in heat transfer relation with another condenser.

A further purpose is to humidify a room by the evaporation of waste water from a water cooler.

Further purposes appear in the specification and in the claims.

In the drawings I have chosen to illustrate one only of the numerous embodiments in which my invention may appear, choosing the forms shown from the standpoints of convenience in illustration, satisfactory operation and clear demonstration of the principles involved.

Figure 1 is a front elevation of a water cooler to which my invention has been applied.

Figure 2 is a side elevation partly in section of the water cooler of Figure 1.

Describing in illustration but not in limitation and referring to the drawings:

In many water cooler and drinking fountain installations it would be desirable to increase the condenser cooling capacity, both to avoid the necessity of using dynamic condenser units equipped with fans or water control valves or the like which may get out of order, and also to facilitate the operation of the mechanical refrigeration mechanism.

It is also desirable particularly in office buildings during winter operation to humidify the room.

I find that both of these purposes can be accomplished by employing a condenser which will give off heat by vaporizing waste water from the water cooler dispenser. This condenser may be used alone, but will preferably be coupled with a static air condenser and/or a condenser operating from absorption of sensible heat from the refrigerant by the cold waste water.

In accordance with the invention a water cooler cabinet 20 suitably of rectangular form is provided with a water storage and cooling compartment 21 near the top accessible through a removable lid 22 and insulated at 23 on its various walls. Water from the water cooling and storage department is dispensed by a dispenser 24, which in this case will preferably be a faucet rather than a bubbler, and surplus waste water is taken up by a sump 25 below the dispenser.

The cooling of the water in the space 21 is accomplished by a cooling unit 26 in heat transfer relation with the water to be cooled, connected to a mechanical refrigeration unit which suitably consists of a compressor-motor (hermetic) unit 27, which compresses refrigerant and passes it out a pipe 28 to a water evaporation condenser 29 from which it flows to a static condenser 30 and thence to a sensible heat water condenser 31, after which the refrigerant passes through a metering device 32 (expansion valve or constrictor), then to the cooling unit 26 and finally returns to the compressor through a pipe 37. A suitable electric thermostatic switch 38 in heat transfer contact with the cooling unit controls the operation of the cycle.

Water from the sump 25 flows through a pipe 39 into a sensible heat condenser channel 40 which extends generally horizontally in heat transfer relation with the condenser 31, extracting heat therefrom quite effectively because the water is cold. From the discharge end of the channel 40 water flows at 41 into a water storage compartment 42 in which is contained the condenser 29. Water is drained from the water storage compartment 42 when required through a cock 43, but for most efficient operation a relatively high level at 42' should be maintained to provide a substantial body of water for evaporation by the hot refrigerant from the condenser 29.

In the preferred embodiment a static air condenser 30 is provided at the back of the cooler in a vertical air flue 44 open at the bottom at 45 and at the top at 46.

In the preferred embodiment the refrigerant is first carried from the compressor to the water evaporation condenser 29, where it can give up heat by evaporating water and at the same time creating water vapor and will act as a humidifier throughout the room in which the cooler is located. To aid in the humidification a passage 47 is located from the cabinet above the water storage compartment into the air flue 44 at the back. From the condenser 29 refrigerant is next carried preferably to the static air condenser 30, where this is employed, more heat being there extracted to bring the temperature down to room temperature. From the condenser 30 the refrigerant is next carried to the condenser 31 where the refrigerant may reach a temperature below that of atmospheric air when cold waste water is flowing through the channel 40.

It will be evident that the device is useful not only to increase the effectiveness of condensation, but also to act as a humidifier particularly during the winter in a heated room.

It will be evident that the walls of the waste water and condenser tank are desirably extended high enough so that if excess water accumulates in the tank it will be visible in the drip basin thus warning the user of the necessity of emptying the tank.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a water cooler, a mechanical refrigeration unit including a cooling unit and a plurality of condensers, a water cooling chamber in heat transfer relation with the cooling unit, a dispenser connected to the water cooling chamber, a sump collecting waste water from the dispenser, a waste water channel connected to the sump and in heat transfer relation to one of the condensers through which waste water passes in flow and a waste water storage compartment receiving water from the waste water channel and in heat transfer relation to another of the condensers, whereby a portion of the heat in the condensers is utilized in vaporizing waste water.

2. In a water cooler, a mechanical refrigeration unit including a cooling unit and three condensers, a water cooling chamber in heat transfer relation with the cooling unit, a dispenser connected to the water cooling chamber, a sump collecting waste water from the dispenser, a waste water cooling channel connected to the sump and in heat transfer relation to the last of the three condensers in sequence to the cooling unit, and a waste water storage compartment receiving water from the waste water channel and in heat transfer relation to the first of the condensers in sequence to the cooling coil, the second of the condensers in sequence to the cooling coil being an air condenser.

JOHN G. WEHRWEIN.

REFERENCES CITED

The following references are of record in the file of this patent:

UNITED STATES PATENTS

| Number | Name | Date |
|---|---|---|
| 1,811,215 | Smith | June 23, 1931 |
| 1,953,420 | Mason | Apr. 3, 1934 |
| 2,347,905 | Hait | May 2, 1944 |
| 2,365,786 | Tull | Dec. 26, 1944 |